UNITED STATES PATENT OFFICE 2,523,490

RECOVERY OF LOWER ALKANOIC ACIDS FROM SULFONATION REACTION PRODUCTS

Chester E. Adams, Highland, Ind., and Carl E. Johnson, St. Louis, Mich., assignors to Standard Oil Company, Chicago, Ill., a corporation of Indiana No Drawing. Application January 25, 1947, Serial No. 724,480

11 Claims. (Cl. 260—513)

This invention relates to the production of alkenesulfonates, and more particularly to the recovery of lower-alkanoic acids from mixtures thereof with alkenesulfonic acids and inert organic solvents.

Our process broadly comprises a method for treating sulfonic acid compositions obtained, for example, in the sulfonation of olefins or olefin polymers in the presence of lower-alkanoic anhydrides or halides, whereby we are enabled to recover the resulting alkanoic acids by extracting said reaction products with aqueous sulfuric acid, suitably having a concentration of $H_2SO_4$ between about 50 and 90% by weight.

We have heretofore observed that in the sulfonation of olefins or olefin polymers by treatment with sulfuric acid, greatly superior yields of the desired sulfonated products are obtained if the sulfonation is carried out in the presence of a lower-alkanoic acid anhydride or halide. In the sulfonation reaction, however, the lower-alkanoic acid anhydride or halide is converted into the lower-alkanoic acid, which, for economic reasons, should be recovered and returned to process, after being reconverted into the anhydride or halide. This recovery has proved to be very difficult, owing to the nature of the sulfonation products. It is, therefore, an object of our invention to provide a method for recovering lower-alkanoic acids from such compositions. A further object of our invention is to produce alkenesulfonic acids substantially uncontaminated with lower-alkanoic acids. Further objects and advantages will be apparent from the following description.

The direct sulfonation of monoolefins or monoolefin polymers ordinarily leads to the production of paraffinic hydrocarbons and polyolefins through hydrogen transfer during the sulfonation reaction. This can be avoided almost completely, as disclosed in our copending application, Serial No. 679,854, filed June 27, 1946 (now abandoned), by incorporating in the sulfonation mixture a quantity of lower-alkanoic acid anhydride, lower-alkanoic acid mixed anhydride, or lower-alkanoic acid halide, such as acetic anhydride, acetic propionic anhydride, propionic anhydride, butyric anhydride, valeric anhydride, hexanoic anhydride, acetic hexanoic anhydride, acetyl chloride, propionyl chloride, valeryl chloride, hexanoyl bromide, and the like. The anhydride or halide is preferably used in equimolar ratio to the olefin or polymer; however, this ratio is not critical, and from about 0.5 to 2.0 moles per mole of olefin or polymer may be employed. The sulfonation is carried out at a temperature below about 150° F., and preferably within the range of about 30 to 80° F., and sufficient time is usually allowed, ordinarily around 3 to 5 hours, to permit the reaction to go as nearly to completion as economic considerations will allow. Products of superior appearance and odor are obtained when the sulfonation is carried out in the presence of an inert organic solvent, such as a chlorinated hydrocarbon, for example carbon tetrachloride, ethylene dichloride, trichloroethylene, chloroform, and the like, or a light, saturated hydrocarbon, for example pentanes, hexanes, or heptanes. Moreover, the presence of such solvents is helpful in the subsequent recovery of lower-alkanoic acids from the reaction product by our process, described below.

For use in the above sulfonation reactions, monoolefins and monoolefin polymers in general are satisfactory. Among the monoolefins may be cited ethylene, propylene, butylene, isobutylene, hexylenes, decenes, cetenes, and the like. Suitable monoolefin polymers may be prepared by polymerizing such olefins or mixtures of olefins by known methods, such as by use of sulfuric acid, phosphoric acid, aluminum chloride, boron fluoride, or other polymerization catalysts.

After the sulfonation reaction is complete, the product may be homogeneous or heterogeneous, depending upon the concentration of sulfuric acid used. The unreacted sulfuric acid may be caused to separate from the sulfonic acids as a lower layer by addition of water or less-concentrated aqueous sulfuric acid to the reaction product. We have discovered that this layer contains a substantial proportion of the lower-alkanoic acid produced in the sulfonation process; the dilution of the sulfonation product, if required, and the separation of the resulting aqueous sulfuric acid layer may therefore be considered the first step in our process. Subsequently, the upper layer, comprising alkenesulfonic acids, inert organic solvent, lower-alkanoic acids, and a small quantity of sulfuric acid, is further extracted with aqueous sulfuric acid, either by continuous countercurrent procedure, or by repeated batch extractions, until substantially all of the lower-alkanoic acids remaining in said upper layer have been removed. The purified upper layer is subsequently further processed to isolate the desired alkenesulfonic acid soaps. The inert organic solvent and unreacted olefins or olefin polymers are first distilled out or otherwise removed, and may be returned to process. Any traces of lower-alkanoic acids remaining in the alkenesulfonic acid solution may then be removed by carefully adjusting the solution to a pH around 5 to 7, the alkenesulfonic acids being thereby tied up in the form of salts, and subsequently distilling out the traces of lower-alkenoic acids. The alkenesulfonic acid soaps may then be isolated by conventional means, such as by evaporation, or by spray drying.

The lower-alkanoic acids may be separated from the combined aqueous sulfuric acid extracts by distillation or by extraction with a suitable solvent, and the exhausted sulfuric acid may then be recycled, after a concentration step if desired.

The effectiveness of our invention rests on our discovery of an unexpectedly favorable relationship between the solubilities of alkenesulfonic acids and lower-alkanoic acids in aqueous sulfuric acid over a specific range of $H_2SO_4$ concentrations. Alkenesulfonic acids are known to be soluble in dilute aqueous sulfuric acid approaching zero $H_2SO_4$ concentration, and we have found that they are appreciably soluble in concentrated aqueous sulfuric acid approaching 100% $H_2SO_4$. In aqueous sulfuric acid having an $H_2SO_4$ concentration between about 50 and 90 percent by weight, however, alkenesulfonic acids are substantially insoluble, whereas the lower-alkanoic acids are readily dissolved. Within this range, therefore, aqueous sulfuric acid is a very effective selective extractant for lower-alkanoic acids from alkenesulfonic acid solutions, particularly in the presence of inert organic solvents, as set forth above, which tend further to repress the tendency of alkenesulfonic acids to dissolve in aqueous sulfuric acid. Our process is operative to some degree with aqueous sulfuric acid of any $H_2SO_4$ concentration which permits the formation of two layers; however, for best results we prefer to operate at a concentration of $H_2SO_4$ around 70%.

The temperature employed in the extraction of lower-alkanoic acids from alkenesulfonic acids according to our process is not critical, in view of the known stability of the components of the reaction mixture, even at substantially elevated temperatures. It will be apparent that the temperature should not be below the freezing point of the aqueous sulfuric acid layer, and should not be above the boiling point of the reaction mixture under the pressure existing in the extraction vessel. If desired, elevated pressures may be utilized to permit the use of higher temperatures. Ordinarily, however, we prefer to operate around atmospheric pressure and at temperatures below about 150° F.

For substantially complete removal of lower-alkanoic acids from alkenesulfonic acid, we have found between about one-tenth and one volume of aqueous sulfuric acid per volume of reaction product to be ample.

The term "lower-alkanoic acids" used herein is to be understood to include alkanoic acids having six carbon atoms or less in the molecule.

Our invention may be more fully understood by the following example:

*Example*

A refinery gas stream consisting primarily of isobutylene, 1-butene, 2-butene, and butane was passed at a pressure of 600 pounds per square inch, gage, and an average temperature of 188° F., upward through a liquid aluminum chloride-hydrocarbon complex containing 0.05% by weight of hydrogen chloride, based on the feed gas, at a feed rate of 2.10 gallons per hour per pound of aluminum chloride initially charged to the reaction vessel. A product of the following composition resulted:

| | Percent by volume |
|---|---|
| $C_5$—350° F | 12.5 |
| $C_{12-16}$ | 21.8 |
| $C_{17-22}$ | 25.6 |
| $C_{23+}$ | 40.1 |

The $C_{17-22}$ fraction was separated by distillation and found to have the following properties:

| | |
|---|---|
| Bromine No | 64.5 |
| Molecular weight | 244 |
| Avg. No. C atoms | 17.4 |
| Specific gravity | 0.815 |

To a mixture of 0.71 mole of the $C_{17-22}$ polymer, an equal volume of carbon tetrachloride, and 0.72 mole of acetic acid was added 0.854 mole of 100% sulfuric acid. Immediately thereafter, 0.72 mole of acetic anhydride was added, and the mixture was agitated for approximately one hour. On standing, a sulfuric acid layer separated, and was withdrawn. The sulfonic acid layer was subsequently extracted twice with one-third its volume of aqueous 70% sulfuric acid. Electrometric titration of the combined sulfuric acid layers revealed that they contained acetic acid equivalent to all of the acetic acid and acetic anhydride charged to the reaction vessel. An aliquot of the extracts was stripped with nitrogen at 250–260° F., and by this method 95.6% of the acetic acid was recovered as an aqueous solution containing approximately 65% acetic acid.

While the above example represents the preferred form of our invention, it is to be understood that departures may be made therefrom within the scope of the specification and claims. In general, it may be said that any modifications or equivalents that would ordinarily occur to one skilled in the art are to be considered as lying within the scope of our invention.

In accordance with the foregoing specification, we claim as our invention:

1. In a process wherein a hydrocarbon liquid comprising at least one mono-olefin is treated with concentrated sulfuric acid in the presence of an additive selected from the class consisting of lower-alkanoic anhydrides, lower-alkanoic mixed anhydrides and lower-alkanoyl halides to form at least one sulfonic acid derivative of said mono-olefin and the corresponding lower-alkanoic acid derivable from said additive and wherein the reaction mixture is separated into an oily fraction and a predominantly sulfuric acid fraction, the improvement which comprises contacting said oily fraction with an aqueous soluton of sulfuric acid containing from about 50 to about 90 percent by weight of sulfuric acid, in a ratio of about 0.1 to 1.0 volume of aqueous solution of sulfuric acid per volume of said oily fraction, at a temperature below about 150° F. and above the freezing point of said aqueous solution of sulfuric acid, whereby the major part of said lower-alkanoic acid and the major part of unreacted additive is removed from said oily layer by said aqueous solution of sulfuric acid.

2. A process for separating a lower-alkanoic acid from a solution thereof in a mixture of an alkenesulfonic acid and an inert organic solvent which comprises contacting said solution with aqueous sulfuric acid having a concentration of $H_2SO_4$ between about 50 and 90% by weight, in a ratio of about 0.1 to 1.0 volume of aqueous sulfuric acid per volume of said alkenesulfonic acid mixture, at a temperature below about 150° F. and above the freezing point of said aqueous sulfuric acid; and separating and withdrawing an aqueous sulfuric acid phase containing said lower-alkanoic acid.

3. The process of claim 2 wherein said inert organic solvent is a light, saturated hydrocarbon.

4. The process of claim 2 wherein said inert organic solvent is a chlorinated hydrocarbon.

5. process for separating a lower-alkanoic acid from an alkenesulfonic acid solution thereof which comprises contacting said alkenesulfonic acid solution with aqueous sulfuric acid having a concentration of $H_2SO_4$ between about 50 and 90 percent by weight, in a ratio of about 0.1 to 1.0 volume of aqueous sulfuric acid per volume of alkenesulfonic acid solution, at a temperature below about 150° F. and above the freezing point of said aqueous sulfuric acid; separating and withdrawing an aqueous extract phase comprising sulfuric acid and the greater part of said lower-alkanoic acid and a raffinate phase comprising alkenesulfonic acid and a minor proportion of said lower-alkanoic acid; adjusting said raffinate phase to a pH between about 5 and 7; and distilling said minor proportion of said lower-alkanoic acid from said raffinate phase.

6. The process of claim 5 wherein a stream of an inert gas is passed through said raffinate phase during the distillation of said lower-alkanoic acid therefrom.

7. A process for separating a lower-alkanoic acid from a solution thereof in an alkenesulfonic acid which comprises contacting said solution with aqueous sulfuric acid having a concentration of $H_2SO_4$ between about 50 and 90% by weight, in a ratio of about 0.1 to 1.0 volume of aqueous sulfuric acid per volume of alkenesulfonic acid solution, at a temperature below about 150° F. and above the freezing point of said aqueous sulfuric acid; and separating and withdrawing an aqueous sulfuric acid phase containing said lower-alkanoic acid.

8. The process of claim 7 which includes the additional steps of distilling said lower-alkanoic acid from said aqueous sulfuric acid phase, and recycling the resulting lean aqueous sulfuric acid phase to the initial contacting step.

9. A process for separating acetic acid from a solution thereof in a mixture of a polypropylene-sulfonic acid and a light, saturated hydrocarbon which comprises contacting said solution with aqueous sulfuric acid having a concentration of $H_2SO_4$ between about 50 and 90 percent by weight, in a ratio of about 0.1 to 1.0 volume of aqueous sulfuric acid per volume of said polypropylene-sulfonic acid mixture, at a temperature below about 150° F. and above the freezing point of said aqueous sulfuric acid; and separating and withdrawing an aqueous sulfuric acid phase containing acetic acid.

10. A process for separating acetic acid from a solution thereof in a mixture of a polybutylene-sulfonic acid and a light, saturated hydrocarbon which comprises contacting said solution with aqueous sulfuric acid having a concentration of $H_2SO_4$ between about 50 and 90 percent by weight, in a ratio of about 0.1 to 1.0 volume of aqueous sulfuric acid per volume of said polybutylene-sulfonic acid mixture, at a temperature below about 150° F. and above the freezing point of said aqueous sulfuric acid; and separating and withdrawing an aqueous sulfuric acid phase containing acetic acid.

11. A process for separating a lower-alkanoic acid from a solution thereof in an alkenesulfonic acid which comprises contacting said solution with aqueous sulfuric acid having a concentration of $H_2SO_4$ between about 50 and 90 percent by weight, in a ratio above about 0.1 volume of aqueous sulfuric acid per volume of alkenesulfonic acid solution, at a temperature below about 150° F. and above the freezing point of said aqueous sulfuric acid; and separating and withdrawing an aqueous sulfuric acid phase containing said lower-alkanoic acid.

CHESTER E. ADAMS.
CARL E. JOHNSON.

REFERENCES CITED

The following references are of record in the file of this patent:

UNITED STATES PATENTS

| Number | Name | Date |
|---|---|---|
| 2,250,092 | Colgate | July 22, 1941 |
| 2,373,793 | Susie | Apr. 17, 1945 |
| 2,037,229 | Gunther et al. | Apr. 14, 1946 |